No. 718,552. PATENTED JAN. 13, 1903.
H. F. WALLMANN.
MIXING DEVICE FOR EXPLOSIVE ENGINES.
APPLICATION FILED DEC. 17, 1898.
NO MODEL. 5 SHEETS—SHEET 1.
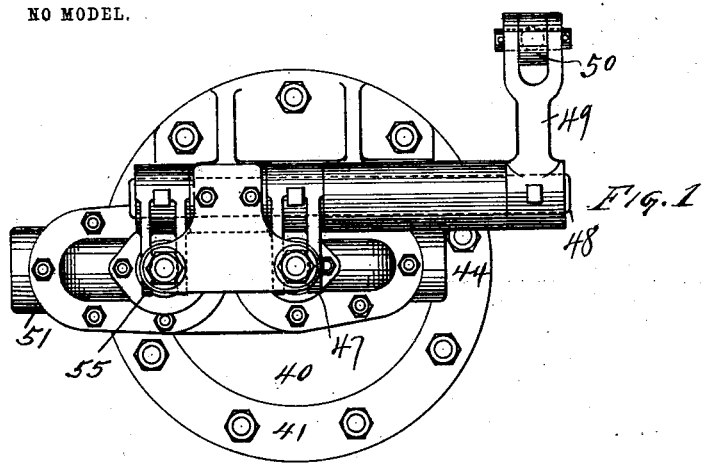
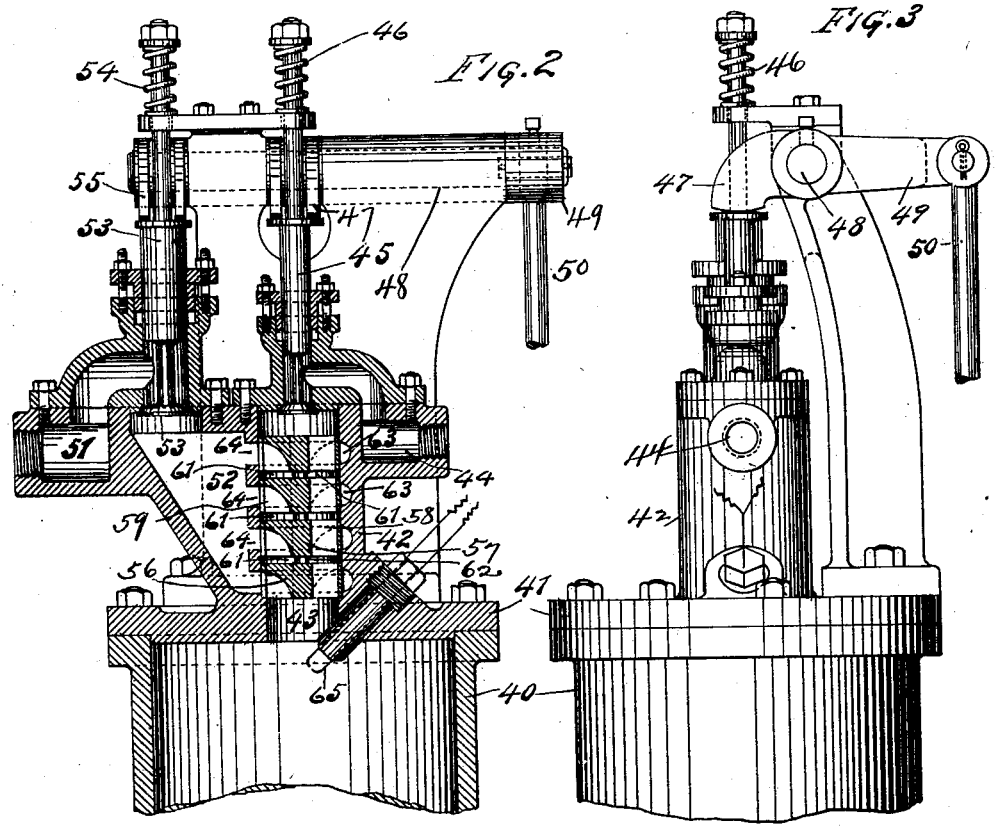
Witnesses
Inventor
Henning F. Wallmann.

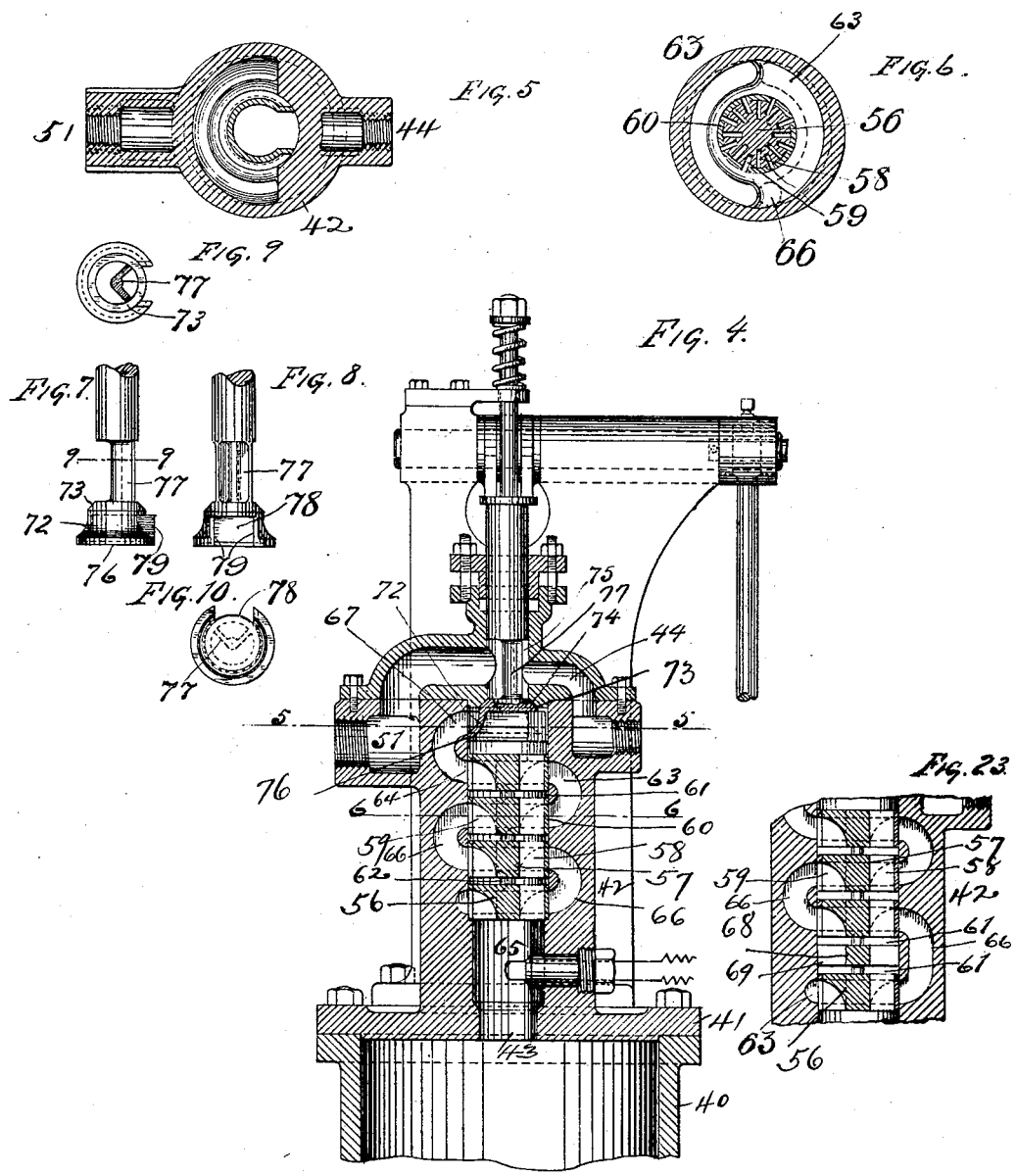

No. 718,552. PATENTED JAN. 13, 1903.
H. F. WALLMANN.
MIXING DEVICE FOR EXPLOSIVE ENGINES.
APPLICATION FILED DEC. 17, 1898.
NO MODEL. 5 SHEETS—SHEET 3.
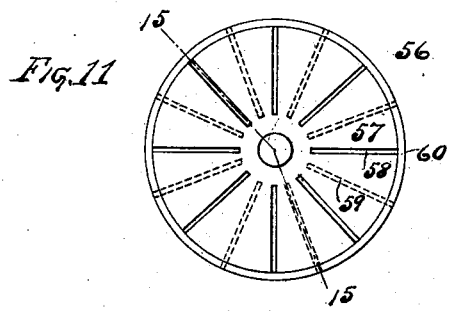
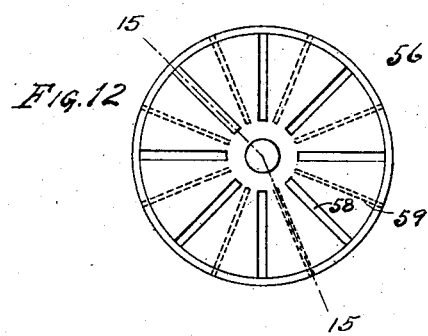
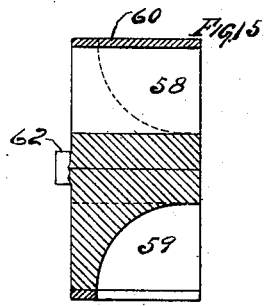
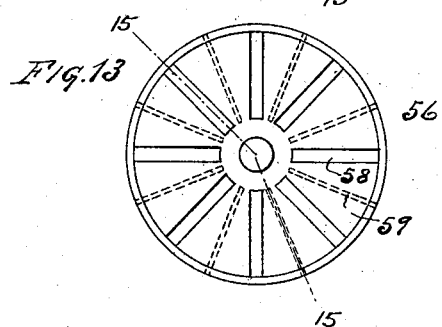
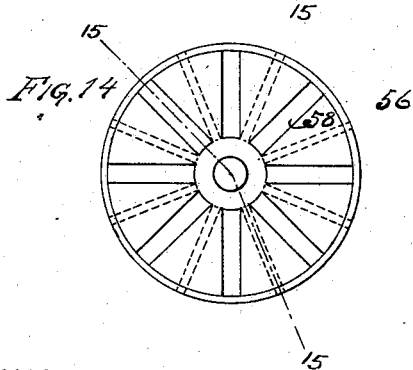
Witnesses
Hugo W. Forslund
S. A. Goldberg
Inventor
Henning F. Wallmann No. 718,552. PATENTED JAN. 13, 1903.
H. F. WALLMANN.
MIXING DEVICE FOR EXPLOSIVE ENGINES.
APPLICATION FILED DEC. 17, 1898.
NO MODEL. 5 SHEETS—SHEET 4.
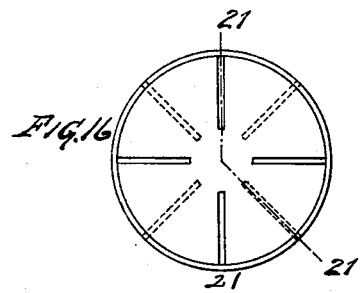
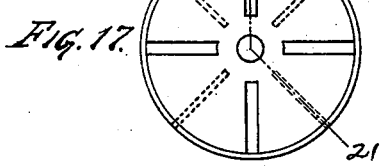
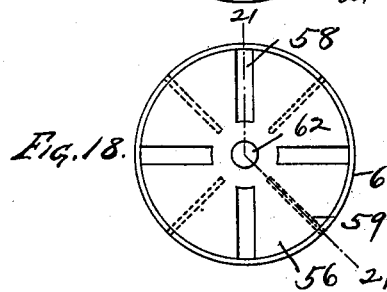
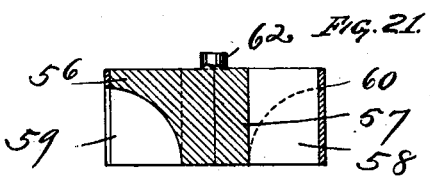
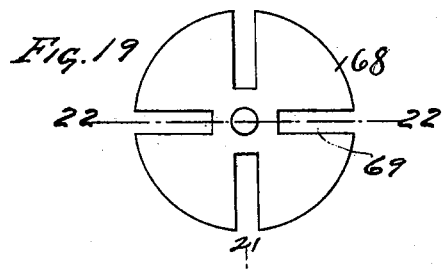
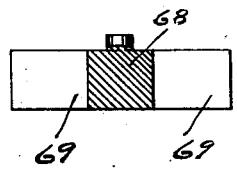
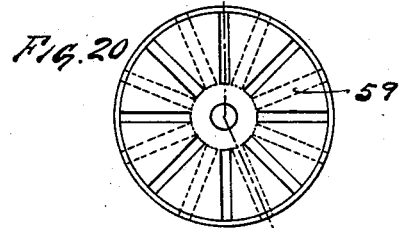
Witnesses
Hugo W. Forslund
S. A. Goldberg
Inventor
Henning F. Wallmann

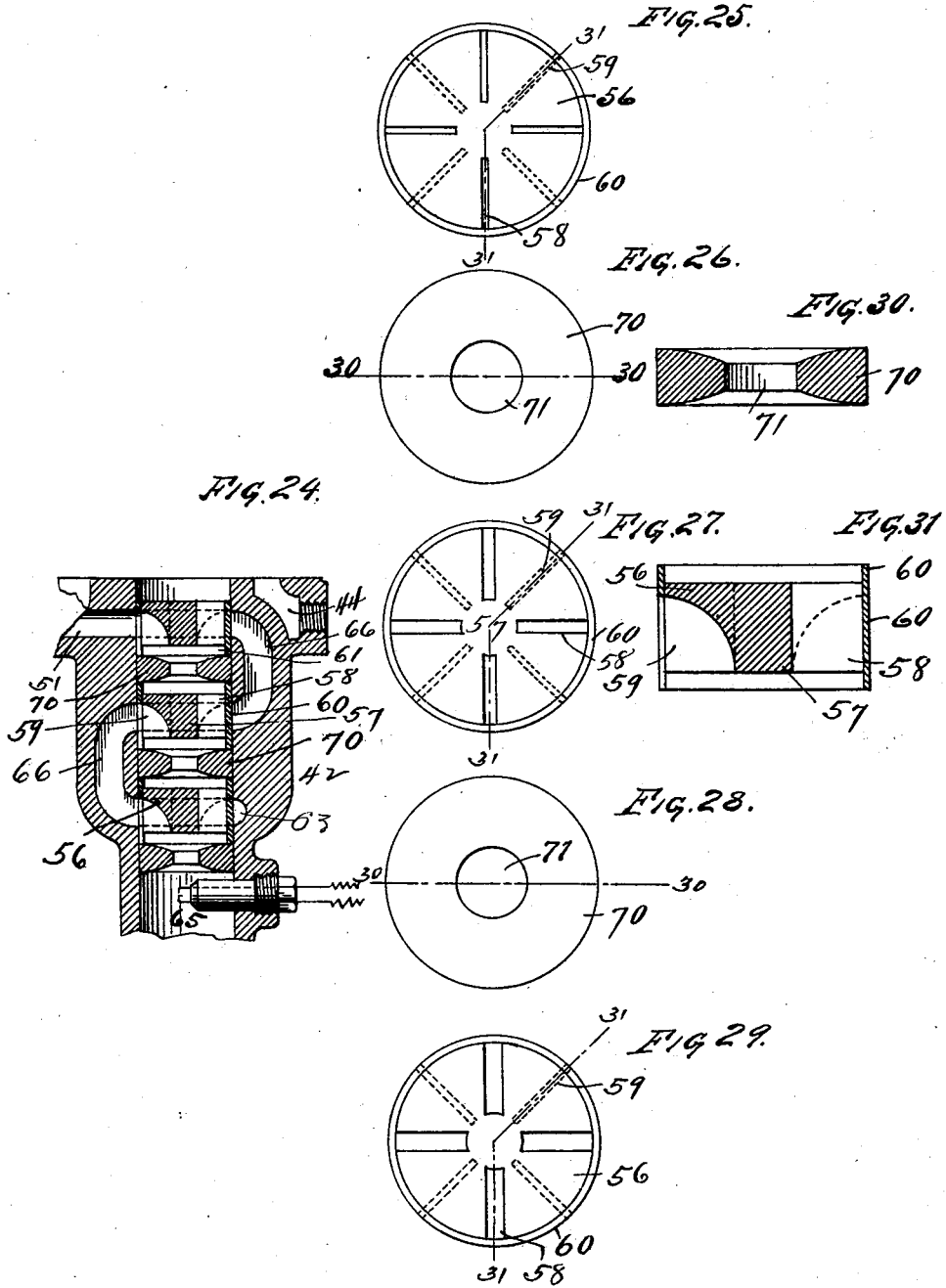

UNITED STATES PATENT OFFICE.

HENNING FRIEDRICH WALLMANN, OF CHICAGO, ILLINOIS, ASSIGNOR TO THE WALLMANN ENGINE COMPANY, A CORPORATION OF ILLINOIS.

MIXING DEVICE FOR EXPLOSIVE-ENGINES.

SPECIFICATION forming part of Letters Patent No. 718,552, dated January 13, 1903.

Application filed December 17, 1898. Serial No. 699,577. (No model.)

*To all whom it may concern:*

Be it known that I, HENNING FRIEDRICH WALLMANN, of Chicago, in the county of Cook and State of Illinois, have invented certain new and useful Improvements in Mixing Devices for Explosive-Engines, of which the following is a specification.

This invention relates to mixers for commingling air and gas or gaseous fuel, and has for its object to provide means whereby a thorough and complete commingling of the two elements to be mixed may be effected in a brief period of time and in a comparatively small space while moving toward the point of delivery of the mixture and without arresting their onward movement.

To these ends the invention consists in certain novel features which I will now proceed to describe and will then particularly point out in the claims.

In the accompanying drawings, Figure 1 is a plan view of an apparatus embodying my invention in one form and illustrating one application thereof. Fig. 2 is a front elevation, partly in vertical section, of the same. Fig. 3 is a side elevation. Fig. 4 is a view similar to Fig. 2, illustrating a modified form of apparatus embodying my invention. Fig. 5 is a detail plan section taken on the line 5 5 of Fig. 4. Fig. 6 is a similar view, taken on the line 6 6 of Fig. 4. Fig. 7 is a front elevation of the form of valve shown in Fig. 4; Fig. 8, a side elevation of the same; Fig. 9, a plan section taken on the line 9 9 of Fig. 7; Fig. 10, a bottom plan view of said valve. Figs. 11, 12, 13, and 14 are respectively plan views of the successive slotted disks forming a part of the mixer. Fig. 15 is a vertical sectional view of one of said disks, taken on the line 15 15 of Figs. 11 to 14. Figs. 16, 17, 18, 19, and 20 are views similar to Figs. 11 to 14, giving plan views of a modified series of disks. Fig. 21 is a vertical sectional view taken on the line 21 21 of Figs. 16, 17, 18, or 20. Fig. 22 is a vertical sectional view taken on the line 22 22 of Fig. 19. Fig. 23 is a detail sectional view corresponding with Figs. 2 and 4, illustrating a modified form of mixer composed of the disks shown in Figs. 16 to 22, inclusive. Fig. 24 is a view similar to Fig. 23, illustrating a further modification of the apparatus. Figs. 25 to 29 are plan views illustrating the series of disks employed in constructing the modification illustrated in Fig. 24. Fig. 30 is a sectional view taken on the line 30 30 of Figs. 26 and 28; and Fig. 31 is a sectional view taken on the line 31 31 of Figs. 25, 27, and 29.

My invention is applicable to the mixing of air and gas or other fluids for any purpose whatsoever, but is more particularly designed for use in gas-engines employing a mixture of air and gas or hydrocarbon vapor or the like under high pressure, and in the accompanying drawings I have shown an apparatus embodying my invention in a machine of this type, in which the mixed air and gas is introduced into the power-cylinder of an engine and there ignited.

In the said drawings, 40 represents the cylinder of an engine, having a head 41, with which, in the present instance, I have shown the casing 42 of the mixer as cast or formed in one piece. This casing is provided with a chamber 43, preferably cylindrical in form and extending from the point of admission of the gas to the point of discharge into the cylinder 40.

44 represents the gas-inlet passage, which is connected by a suitable pipe or conduit to a supply of gas, preferably under pressure. The connection between the gas-supply passage 44 and the receiving end of the chamber 43 is controlled by a valve 45, preferably of the balanced type, as shown, and adapted to be held normally closed by a spring 46 and to be depressed to open the valve by means of a tappet 47 on a rock-shaft 48, having an arm 49, by means of which said rock-shaft is actuated from some suitable part of the engine through the medium of a rod 50.

51 indicates the air-inlet passage, which is connected to a source of supply of air under pressure in any suitable manner and which in the form of apparatus shown in Figs. 1, 2, and 3 communicates with an air-chamber 52, formed in the casing 42, its inlet into said chamber being controlled by a balanced valve 53, normally closed by a spring 54, and depressed for the purpose of opening said valve by a tappet 55 on the rock-shaft 48. It will be understood, of course, that the tappets 47 and 55 may be so adjusted as to operate the gas and air valves either simultaneously or successively at any desired time, as circumstances may require. It will be also understood that any approved form of valve and valve mechanism may be substituted for those shown.

Within the mixing-chamber 43 is located the mixer proper, which in the form shown comprises a plurality of superposed disks 56, having passages therethrough for the gas or commingled gas and air and also other passages opening thereinto laterally at intervals for the introduction of air in conjunction with a plurality of spaces communicating with both sets of passages and in which the gas and air may be thoroughly commingled. In the form shown in Figs. 2, 4, and 11 to 15, inclusive, each disk is composed of a cylindrical body portion 57, having a plurality of passages 58 extending therethrough from top to bottom and a corresponding plurality of passages 59 extending from the side or periphery of the disk inward and downward to the bottom thereof. In the preferred form of construction these passages 58 and 59 are radial, being very readily and cheaply formed by cutting radial slots from the margin of the body inward toward the center thereof, the through-passages 58 extending from top to bottom, while the passages 59, which have lateral and bottom openings, but no top opening, are cut through from the side below the top, as indicated in Fig. 15. With this form of construction the disk is completed by means of an annular marginal band 60 surrounding the periphery thereof and secured thereto in any suitable manner. This marginal band is placed upon the disk after the radial slots or passages 58 have been cut and preferably before the slots 59 have been cut, so that these latter may conveniently be cut through both the band and body of the disk at the same time. This mode of construction provides a cheap and effective manner of forming the passages 58 and 59 in the disks; but I do not wish to be understood as limiting myself to this particular mode of forming these passages.

As hereinbefore stated, the several disks 56 are superposed upon each other in a vertical series, and there are formed between each pair of disks commingling chambers or spaces 61, which are preferably and conveniently produced by spacing the disks a short distance apart. This may be accomplished, as in the construction shown in Figs. 2, 4, 15 to 23, inclusive, by providing each disk with a central hub or projection 62, extending upward beyond the upper face of the disk a short distance, so that the disk immediately above may rest thereon. Of course these projections may be formed on the under side instead of on the upper side of the disks or partly on each disk, or they may be in the form of separate interposed pieces. The passages 58 in the uppermost disk are of substantially the same size as the passages 59 therein. In the next disk, however, the passages 58 are larger, being, preferably, substantially equal in cross-sectional area or capacity to the combined size of the passages 58 and 59 of the upper disk. Similarly the passages 58 of the third disk are correspondingly increased in size, so as to equal in capacity the corresponding passage 58 of the first disk plus twice the capacity of the passage 59, and the same is true of the passages 58 of the fourth disk, which are equal in capacity to the passage 58 of the first disk plus three times that of the passages 59. It will be understood that the passages 59 are of substantially the same dimensions in all of the disks.

The casing 42 is provided with a plurality of annular passages 63, extending circumferentially around the same on a level with each of the disks 56, the lateral openings of the passages 59 being in communication with said annular passages 63 and these latter being in communication with the air-inlet. In the construction shown in Fig. 2 this latter communication is effected by having each of the passages 63 communicate independently and directly with the air-chamber 52 by means of a port 64.

In the form of apparatus shown in Fig. 2 there is provided an igniting device 65, which may be located within the cylinder 40 at the point where the mixing-chamber 43 opens into said cylinder.

In the operation of the mechanism just described air and gas under pressure are admitted at the desired intervals through the valves 45 and 53. The gas passes downward through the passages 58 in the uppermost disk 56, and air is admitted at the same time through the passages 59 of said uppermost disk, the air and gas thus admitted commingling in the uppermost commingling space or chamber 61. The mixture of gas and air thus formed passes downward through the passages 58 of the second disk 56, while a further quantity of air is admitted through the passages 59 of said second disk and is added to and commingled with the mixture of gas and air which has already passed through the passages 58 of said second disk in the second commingling space or chamber 61. The mixture thus formed passes through the passages 58 of the third disk and in the third commingling space or chamber has an additional quantity of air added to and mixed with it, which additional quantity has entered through the passages 59 of the third disk. This mixture passes through the passages 58 of the fourth disk and is commingled with an additional quantity of air, which enters through the passages 59 of said fourth disk before entering the cylinder 40.

It will be observed that instead of bringing together at once the entire quantity of gas and of air, of which the mixture ultimately sought to be produced and utilized is composed, only a portion of the air is first brought together with the gas, and when this portion of air is thoroughly commingled with the gas another portion of air is then added to the mixture thus formed and commingled therewith. This successive adding of the air in separate volumes or quantities, first to the gas alone and then to the successive mixtures of gas and air previously produced, insures a thorough and complete commingling of the gas and air with great rapidity and in a comparatively contracted space without arresting the onward flow of the ingredients toward the point where they are to be utilized. The entire mixing-chamber forms in reality nothing but a portion or continuation of the air and gas passages as contradistinguished from a separate chamber, vessel, or reservoir into which these elements are introduced and either permitted to remain or caused to circulate for a sufficient length of time to effect a satisfactory mixture, as in the apparatus ordinarily employed for this purpose. I have found in practice that by this cumulative method of mixing a much more thorough mixture may be obtained with much greater rapidity and by means of an apparatus which takes up but a very small space.

The successive enlargement of the passages 58 in the series of disks serves to accommodate and facilitate the passage of the mixture toward the discharge or outlet as it increases in volume, owing to the addition thereto of successive quantities of air during its course. It will be at once seen that the number of disks employed may be increased or diminished, as desired, or, in other words, that the number of successive air-inlet or commingling spaces may be varied, according to the requirements of each particular case. The form of construction shown, wherein the mixer is built up of these separate disks, is one which is convenient and inexpensive and facilitates inspection and repair; but it is obvious that the successive mixing-chambers, with their connecting-passages and air-inlets, may be otherwise constructed without departing from my invention.

The air-chamber 52 (shown in Fig. 2 of the drawings) may be dispensed with, and in lieu thereof semi-annular horizontal passages 63, Fig. 6, may be cored in the inner face of the mixing-chamber laterally opposite the several mixing-disks, and the ends of these passages 63 may be connected in a series by means of intermediate vertical passages 66, similarly cored in the inner face of the mixing-chamber, the uppermost passage 63 being connected directly to the air-inlet by a vertical passage 67, corresponding in form and function to the passages 66. Such a form of construction is shown in Figs. 4, 6, 23, and 24.

The particular construction of the passages in the mixer proper may be varied without departing from the principle hereinbefore pointed out, and in Figs. 16 to 23 I have shown one modified form of my invention wherein there is substituted for one of the disks 56, having lateral air-inlet passages as well as through vertical passages, a disk 68, which has no lateral air-inlet passages, but which has comparatively large through vertical passages 69, through which the mixture of air and gas may pass from one commingling-space 61 to another, and thereby be more completely and uniformly mixed together. With this construction one of the annular air-inlet passages 63 is omitted at the point where the disk 68 is employed, and the air-inlet passages 59 of the following disk or disks may be correspondingly enlarged. This enlargement of the passages is advantageous in that it renders them less liable to become clogged or obstructed and at the same time easier to clean. A still further modification in this same general direction is indicated in Figs. 24 to 31, in which the disks 56 are alternately arranged with disks 70, having no lateral air-inlets, but having a central passage or opening 71 of sufficient size to permit the proper passage of the mixture of gas and air and being preferably dished or hollow on their upper and lower faces to enlarge the commingling-spaces. By this construction the entire mixture, after each addition thereto of a quantity of air, is caused to pass from one commingling-space to another through a single opening or passage, and by this means a more effective and equal commingling is obtained. In these figures I have also shown a modified construction for the purpose of spacing or separating the disks, and thus forming the commingling spaces or chambers between them, this being accomplished, as shown in Figs. 24 to 31, by extending the outer band of each disk above and below the body thereof, thereby dispensing with the central projections 62, shown in preceding figures. As shown in Figs. 7, 8, 9, and 10, this valve comprises a bell-shaped valve-body 72, having a continuous circular beveled portion 73 at its upper end, which when the valve is closed bears against a seat 74, constituting the lower mouth of the valve-chamber 75 and completely closes the passage therefrom into the mixer. The lower portion of the bell-shaped body, as indicated at 76, is cylindrical in form and has a sliding fit within the upper end of the mixing-chamber 43 just below the upper end of the air-inlet passage 67, the intermediate bell-shaped portion of the valve-body thus serving to separate the air-inlet passage 67 from the upper end of the mixing-chamber. The valve-stem within the valve-chamber 75 is V-shaped in cross-section, as indicated at 77 and best shown in Figs. 9 and 10, and serves to divide said valve-chamber into two parts, into one of which the gas-inlet passage 44 opens, while the air-inlet passage 51 opens into the other. The intermediate flaring portion and the lower cylindrical portion of the bell-shaped valve-body are vertically cut through, as indicated at 78, on that side of the valve which lies directly below the V-shaped trough of the valve-stem, which is in communication with the gas-inlet side of the valve-chamber. When the valve is depressed, communication is thus established through the vertical side opening 78 of the valve between the gas-inlet passage and the upper part of the mixing-chamber below the valve 72 and at the same time between the air-inlet passage 51 above the valve and the air-inlet passage 67 at the upper end of the mixing-chamber. In order to confine the path of the incoming gas through the opening 78 of the valve-body and direct the same immediately to the vertical openings of the topmost disk, the valve-body may be provided on either side of said opening 78 with vertical partitions 79, the outer vertical margins of which slidingly engage the wall of the mixing-chamber. By reason of this construction the admission of gas and air to the passages 58 and 59, respectively, of the topmost mixing-disk is effected and controlled by a single valve and the construction correspondingly simplified and rendered less expensive.

I claim—

1. A mixer for air and gas, or the like, provided with a plurality of separate longitudinal passages extending therethrough, through which the gas and mixture of gas and air may pass, a plurality of commingling spaces or chambers interrupting the longitudinal continuity of said passages, and a plurality of air-inlet passages respectively communicating with said commingling spaces or chambers, whereby quantities of air may be successively added to and commingled with the gas and mixture, substantially as described.

2. A mixer for air and gas, or the like, provided with a plurality of separate longitudinal passages extending therethrough, through which the gas and mixture of gas and air may pass, each of said passages being of gradually increasing size from the entrance to the discharge end of the mixer, a plurality of commingling spaces or chambers interrupting the longitudinal continuity of said passages, and a plurality of air-inlet passages respectively communicating with said commingling spaces or chambers, whereby quantities of air may be successively added to and commingled with the gas and mixture, and whereby also the passage of the mixture through the mixer is increasingly and progressively facilitated, substantially as described.

3. A mixer for air and gas, comprising a suitable casing having a mixing-chamber therein and a plurality of superposed disks separated to form commingling-spaces between them and having longitudinal passages for the gas and mixture, the longitudinal passages through successive disks being offset with relation to each other so that each successive disk acts as a baffle for the currents entering through the preceding disk, and air-inlet passages having lateral openings communicating with the air-supply and opening at their other ends into the respective commingling-spaces, substantially as described.

4. A mixer for gas and air or the like, comprising a casing having a mixing-chamber provided with circumferential air-passages communicating with the air-supply, and a plurality of disks located in said chamber and each provided with longitudinal passages for the gas or mixture and with air-passages communicating laterally with the circumferential air-passages of the casing, the longitudinal passages of the successive disks being arranged in offset relation to each other so that each successive disk acts as a baffle for the currents entering through the preceding disk, and means for spacing or separating said disks to form commingling-spaces with which the passages of the disks communicate, substantially as described.

5. A mixer for air and gas, comprising a suitable casing having a mixing-chamber extending longitudinally therethrough, a plurality of disks therein separated to form commingling-chambers and each provided with longitudinal passages through its body for the gas or mixture and with laterally-opening passages for the admission of air, and other disks located in the commingling-spaces and each having an aperture through which the mixture of gas and air passes along with the air last introduced, substantially as described.

6. In an air and gas mixer of the character described, a mixing-disk having a cylindrical body and a separate circumferential annulus or band, the body of the disk having radial slots therethrough from top to bottom closed at the periphery of the disk by the marginal band, and alternate slots extending through the band and lower portion of the disk and closed at the top by the body thereof, substantially as described.

7. In an air and gas mixer for engines, the combination with a cylinder and air and gas supply passages, of a mixing-chamber intermediate said cylinder and passages and forming a continuation of the latter, a mixer located in said chamber and having a plurality of separate longitudinal passages formed therethrough for the passage of the gas and mixture, a plurality of commingling spaces or chambers interrupting the longitudinal continuity of said passages, and a plurality of air-inlet passages respectively communicating with said commingling spaces or chambers, and means for supplying air and gas under pressure to the mixer, substantially as described.

HENNING FRIEDRICH WALLMANN.

Witnesses:
FREDERICK C. GOODWIN,
IRVINE MILLER.